(12) United States Patent
Miyazaki et al.

(10) Patent No.: US 6,422,758 B1
(45) Date of Patent: Jul. 23, 2002

(54) ROLLING BEARING UNIT FOR SUPPORTING VEHICLE WHEEL

(75) Inventors: Hiroya Miyazaki; Yoshihisa Ohnuki; Takafumi Kuwano; Hiroyuki Sawai, all of Fujisawa (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 09/641,863

(22) Filed: Aug. 18, 2000

Related U.S. Application Data

(63) Continuation of application No. 09/005,716, filed on Jan. 16, 1998.

(30) Foreign Application Priority Data

| Jan. 17, 1997 | (JP) | 9-6343 |
| Jun. 16, 1997 | (JP) | 9-158878 |
| Nov. 21, 1997 | (JP) | 9-321055 |
| Aug. 28, 1998 | (JP) | 9-232798 |

(51) Int. Cl.$^7$ ............................... F16C 13/60
(52) U.S. Cl. ..................... 384/544; 301/108.1
(58) Field of Search ................. 384/544, 537, 384/585, 573, 625, 912, 913; 301/108.1, 124.1, 131; 29/898.063, 898.066

(56) References Cited

U.S. PATENT DOCUMENTS

| 3,583,511 A | 6/1971 | Asberg |
| 3,589,747 A | 6/1971 | Asberg |
| 3,713,905 A | 1/1973 | Philip et al. |
| 4,241,957 A | 12/1980 | Peck |
| 4,537,270 A | 8/1985 | Branderstein et al. |
| 4,651,140 A | 3/1987 | Duggan |

(List continued on next page.)

FOREIGN PATENT DOCUMENTS

| DE | 3418440 | 11/1985 |
| DE | 3418440 A1 | 11/1985 |
| DE | 3804654 | 8/1989 |
| DE | 195 43 436 A1 | 5/1997 |
| EP | 0 718 513 A1 | 8/1993 |
| EP | 0 736 398 A2 | 3/1996 |
| EP | 0 854 303 A2 | 5/1999 |
| JP | 62-214889 | 9/1987 |
| JP | 63-106426 | 5/1988 |
| JP | 63-184501 | 7/1988 |
| JP | 1-82903 | 6/1989 |
| JP | 3-31001 | 2/1991 |
| JP | 5-215757 | 8/1993 |

OTHER PUBLICATIONS

Kalpakjan, Manufacturing Engineering and Technology, 3$^{rd}$ edition, p. 140.
XP–002096110.
854–303A3 (EPO Abs., Search report).
736398A3 (EPO Abs., Search report).
New Edition of Roller Bearing, Kogyo Chosakiai Publishing, 1st ed., Jun. 15, 1995, A front cover, colophon and p. 44 (B).
NSK Technical Journal, Nippon Seiko Kabushiki Kaisha,, Sep. 10, 1986; A front cover, colophon and p. 14 (C).
Easy Automobile Materials for Design Engineers, Nikkei BP, Sep. 6, 1993; A front cover, colophon and pp. 134–137 (H).

(List continued on next page.)

*Primary Examiner*—David Fenstermacher
*Assistant Examiner*—Colby Hansen
(74) *Attorney, Agent, or Firm*—Rosen & Colin, LLP

(57) ABSTRACT

A bearing unit for vehicle wheel support comprising a shaft having a mounting flange for vehicle wheel or suspension apparatus, a step portion formed on one end portion thereof, a first inner ring raceway directly formed thereon, and a crimped portion formed on the end side of the step portion, and an inner ring fitted onto the step portion and having a second inner ring raceway thereon, the shaft being quench hardened at least at the first inner ring raceway with the crimped portion kept as formed and without quench hardened, and the inner ring being fixed to the shaft by the crimped portion of the shaft.

1 Claim, 12 Drawing Sheets

U.S. PATENT DOCUMENTS

| | | |
|---|---|---|
| 4,880,281 A | 11/1989 | Merkelbach |
| 4,893,960 A | 1/1990 | Beier et al. |
| 4,958,944 A | 9/1990 | Hofmann et al. |
| 5,030,017 A | 7/1991 | Murakami et al. |
| 5,131,145 A | 7/1992 | Badoureaux |
| 5,182,079 A | 1/1993 | Nelson |
| 5,226,738 A | 7/1993 | Valette et al. |
| 5,240,333 A | 8/1993 | Hassiotis et al. |
| 5,259,676 A | 11/1993 | Marti |
| 5,292,200 A | 3/1994 | Matsumoto et al. |
| 5,439,300 A | 8/1995 | Hirakawa et al. |
| 5,490,732 A | 2/1996 | Hofmann et al. |
| 5,536,075 A | 7/1996 | Bertetti |
| 5,544,962 A | 8/1996 | Hofmann et al. |
| 5,720,530 A | 2/1998 | Niebling et al. |
| 5,725,285 A | 3/1998 | Holsnijders et al. |
| 6,217,220 B1 * | 4/2001 | Okhuma et al. ........ 384/544 X |

OTHER PUBLICATIONS

Cold Forging Press Series; Mori Iron Works, Nov. 1996 (K).

The Modern Riveting Technique, Bodmer Kusnacht AG Kusnacht, Aug. 1990(L).

Application and Design of Roller Bearings, Taiga Shuppan, 1st ed., Jun. 1, 1969; A front cover, colophon and p. 90 (M).

Miniature Bearing, Ohmsha, 1st ed., 1st print, Oct. 30, 1969 (N).

New Edition of Introduction to Heat Treatment Techniques, Taiga Shuppan, Jun. 20, 1986 (O).

JIS Handbook on Steel, Japanese Standards Association, 1st ed., 1st print, Apr. 12, 1989; A front cover, colophon and pp. 1259, 1264to 1782 and 1782 to 1783 (P).

Plasticity and Machining, Japanese Society for Technology of Plasticity, Oct. 20, 1988, A front cover, colophon and pp. 1030 to 1031 (Q).

Cold Forging, Nikkei Kogyo Shinbun, Dec. 30, 1969; A front cover, colophon and pp. 71–72 (R).

* cited by examiner

ROLLING BEARING UNIT FOR SUPPORTING VEHICLE WHEEL

This application is a continuation application of U.S. application Ser. No. 09/005,716 filed on Jan. 6, 1998.

FIELD OF THE INVENTION

The present invention is related to a rolling bearing unit for vehicle wheel support, specifically for rotatably supporting a vehicle wheel of an automobile with reference to a suspension apparatus.

BACKGROUND OF THE INVENTION

The vehicle wheel of the automobile is supported by a rolling bearing unit for vehicle wheel support as shown in FIG. 17 where an example of the conventionally widely used rolling bearing units is illustrated.

This rolling bearing unit 1 for vehicle wheel support comprises a hub 2, an inner ring 3, an outer ring 4 and a plurality of rolling elements 5. The hub 2 has an outer peripheral surface the axially outer end portion of which is formed with a first flange 6 to support the vehicle wheel.

The term "axially outer" means the widthwise outer side when installed in the automobile; the left side in the Figures in this application except for FIGS. 4 to 6, while the term "axially inner" means the widthwise central side when installed in the automobile; the right side in the Figures in this application except for FIGS. 4 to 6.

The intermediate portion of the outer peripheral surface of the hub 2 is formed with a first inner ring raceway 7 while the axially inner end portion of the outer peripheral surface is formed with a step portion 8 with a smaller diameter.

The inner ring 3 is fitted onto the step portion 8 and formed with a second inner ring raceway 9 on its outer peripheral surface.

The hub 2 has an axially inner end portion formed with a male thread portion 10 thereon, the tip end portion of which is projected axially inwards than the axially inner end face of the inner ring 3.

A nut 11 is screwed on the male threaded portion 10. The inner ring 3 is supported between the nut 11 and the step face 12 of the step portion 8, and thereby fixed at a determined position of the hub 2.

The male threaded portion 10 is formed with an engagement recess portion 14 in the outer peripheral surface of its tip end portion. After the nut 11 is clamped with a predetermined torque, a portion of the nut 11 in alignment with the engagement recess portion 14 is crimped radially inwards to prevent the nut 11 from being loosened.

Formed on the inner peripheral surface of the outer ring 4 are a first outer ring raceway 15 which is opposed to the first inner ring raceway 7 and a second outer ring raceway 16 which is opposed to the second inner ring raceway 9. A plurality of rolling elements 5 are provided between the first outer ring raceway 15 and the first inner ring raceway 7 and between the second outer ring raceway 16 and the second inner ring raceway 9, respectively.

Although balls are used for the rolling elements in the figure, tapered rollers may be used for the rolling elements in the case of the rolling bearing unit for the heavy automobiles.

In order to install the rolling bearing unit 1 as mentioned above into the automobile, a second flange 17 is formed on the outer peripheral surface of the outer ring 4, and used to fix the outer ring 4 to a suspension apparatus, thereby fixing the vehicle wheel to the first flange 6. Thus, the vehicle wheel can be rotatable supported by the suspension apparatus.

Disclosed in the specification of U.S. Pat. No. 5,490,732 is a rolling bearing unit 1 for vehicle wheel support, which is illustrated as a second conventional example in FIG. 18.

This bearing unit 1 comprises a hub 18 having an peripheral surface on which a first flange 6 is provided and an inner ring 41 and a second inner ring 3 are fitted. The hub 18 has an axially inner end portion which is projected axially inwards than the axially inner end face of the second inner ring 3 and bent radially outwards to form a crimped portion 19. This crimped portion 19 cooperates with the step face 12 provided on the base portion of the first flange 6 on the outer peripheral surface at the intermediate portion of the hub 18 to support the first inner ring 41 and second inner ring 3 therebetween. Specifically, the axially Inner end portion of the hub 18 which is projected axially inwards than the second inner ring 3 is formed with a cylindrical portion which is crimped radially outwards to form the crimped portion 19, which retains the first inner ring 41 and second inner ring 3 onto the step face 12.

In the case of the first conventional example illustrated in FIG. 17, the processes for forming the engagement recess portion 14 on the tip end of the male thread portion 10 and crimping a portion of the nut 11 radially inwards are required. This leads to the cost up due to inconvenient parts production and assembling processes of the bearing unit 1 for vehicle wheel support.

In the case of the second conventional example in FIG. 18, the crimped portion 19 must be formed on the hub 18 to fix the first inner ring 41 and second inner ring 3 to the hub 18. Accordingly, the hub 18 must be made of a material which can be formed with the crimped potion 19. Specifically, in the case of the second conventional example in FIG. 18, since the hub 18 itself is formed with no inner ring raceway, that is since the first and second inner ring raceways 7, 9 are formed on the outer peripheral surface of the first and second inner rings 41, 3 fitted onto the hub 18, the hub 18 can be made of a carbon steel containing less than 0.45 weight % carbon which is easily processed to form the crimped portion 19. However, as the crimped portion 19 is formed, a large load is applied to the second inner ring 3 fitted onto the hub 18, resulting in that the second inner ring 3 is deformed and that the inner clearance (plus or minus) of the rolling bearing unit may be displaced from the required value. When the inner clearance of the rolling bearing unit is displaced from the proper value, the rolling fatigue life of the second inner ring raceway 9 formed on the outer peripheral surface of the second inner ring 3 may be reduced.

Such inconvenience may be produced in the structure where the structure of FIG. 17 and the structure of FIG. 18 are combined to provide the hub 2 with the first flange 6 and the first inner ring raceway 7 and where the inner ring 3 is securely affixed to the hub 2 by way of the crimped portion 19.

In addition, in such a construction, when the hub 18 is made of a carbon steel containing less than 0.45 weight % Carbon as in the conventional structure of FIG. 18, it is impossible to make the hardness in the portion of the first inner ring raceway 7 sufficiently large, and to secure the sufficient durability of the portion of the first inner ring raceway 7.

SUMMARY OF THE INVENTION

An objective of the present invention is to provide a rolling bearing unit for vehicle wheel support with sufficient durability and lower cost.

Another objective of the present invention is to provide a bearing unit for vehicle wheel support comprising a shalt having a mounting flange for vehicle wheel or suspension apparatus, a step portion formed on one end portion thereof, a first inner ring raceway directly formed thereon, and a crimped portion formed on the end side of the step portion, and an inner ring fitted onto the step portion and having a second inner ring raceway thereon, the shaft being quench hardened at least at the first inner ring raceway with the crimped portion kept as formed and without quench hardened, and the inner ring being fixed to the shaft by the crimped portion of the shaft.

DETAILED DESCRIPTION OF THE PREFERRED EMBODIMENTS

Figure 1:
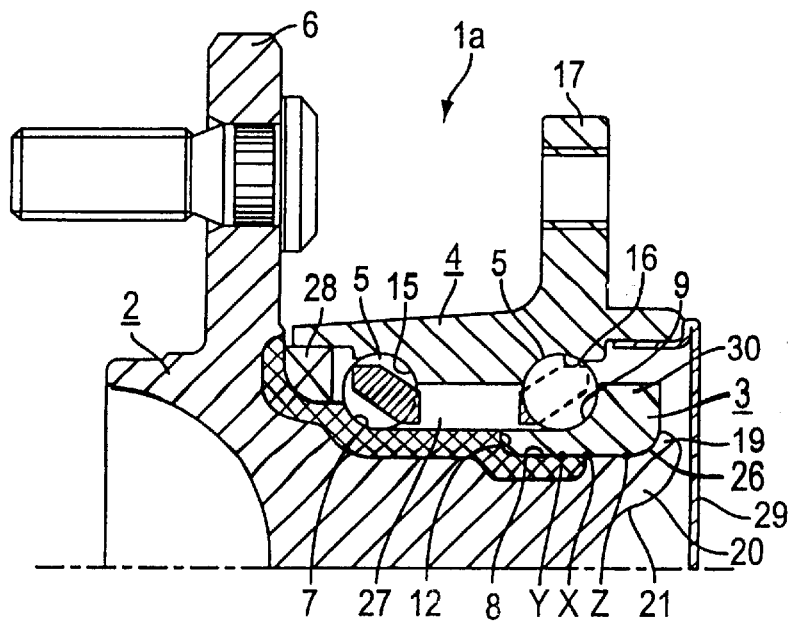
FIG. 1 is a cross sectional view of a half portion of the rolling bearing unit according to a first example in the embodiments of the present invention.

In one feature of the embodiments of the present invention, the rolling bearing unit for vehicle wheel support comprises a hub having an outer peripheral surface formed with a first flange at one axial end portion thereof and a first inner ring raceway at an intermediate portion thereof, a step portion having a step face and formed at the other end portion of the hub, the step portion having a diameter which is smaller than that of the portion where the first inner ring raceway is formed, an inner ring having an outer peripheral surface formed with a second inner ring raceway thereon and fitted onto the step portion, an outer ring having an inner peripheral surface formed with a first outer ring raceway opposed to the first inner ring raceway and a second outer ring raceway opposed to the second inner ring raceway and an outer peripheral surface formed with a second flange thereon, a plurality of rolling elements provided between the first outer ring raceway and the first inner ring raceway and between the second outer ring raceway and the second inner ring raceway, the hub having a cylindrical portion provided at the other axial end portion so as to be projected from the inner ring fitted onto the step portion and the cylindrical portion being crimped radially outwards to form a crimped portion, such that the inner ring fitted onto the step portion is retained onto the step face of the step portion by the crimped portion, whereby the inner ring fitted onto the step portion is securely fixed to the hub.

The hub is made of a high carbon steel containing carbon in the amount of 0.45 weight % or more, and at least the portion of the first inner ring raceway is hardened through a quenching process such as induction hardening, carburizing and quenching, laser quenching. Accordingly, the rolling fatigue life (flaking life) is securely obtained in spite of the load repeatedly applied through the rolling elements.

Specifically, the surface portion of the first inner ring raceway must have a high hardness e.g. from Hv 550 to Hv 900 in order to secure the rolling fatigue life. If the surface portion of the first inner ring raceway has a lower hardness, the rolling fatigue life of the first inner ring raceway would be short.

When the hub is made of a carbon steel containing carbon less than 0.45%, the required hardness could not be secured even if the first inner ring raceway portion is subjected to the quenching.

In the one feature of the embodiments of the present invention, the hub is made of a carbon steel containing carbon of 0.45 weight % or more, and the first inner ring raceway portion is subjected to a quenching, so that the first inner ring raceway has a sufficiently high hardness to obtain the rolling fatigue life of the first inner ring raceway. Since the cylindrical portion of the hub is not subjected to the quenching and kept as it is forged, the process for crimping to connect the hub and the inner ring width each other is not inconvenient.

The inner ring is made of a high carbon steel such as bearing steel and quench hardened to the core, and therefore even if a large load is applied to the inner ring during crimping, it is prevented that inner ring is deformed and that the internal clearance (plus or minus) of the rolling bearing unit is displaced from the desired value.

Specifically, a large load must be applied to the cylindrical portion radially outward to form the crimped portion by crimping out the cylindrical portion. As a result, a large surface pressure is applied to the inner peripheral surface and end face of the inner ring. Accordingly, if the hardness of the inner ring is low, the inner ring would be deformed by the surface pressure and the internal clearance would be displaced from the desired value.

In the one feature of the embodiments of the present invention, however, the inner ring is made of a high carbon steel such as bearing steel and quench hardened to the core, and therefore the hardens of the inner ring is sufficiently high, so that regardless of the large surface pressure, the inner ring is prevented from being deformed and the inner clearance can be kept at the desired value. In addition, the diameter of the second inner ring raceway is prevented from being changed, and the shape precision (roundness, cross section shape) is prevented from being worsened. Thus, the rolling fatigue life is sufficiently kept.

In another feature of the embodiments of the present invention, the rolling bearing unit for vehicle wheel support comprises a hub having an outer peripheral surface formed with a first flange at one axial end portion thereof and a step portion having a step face and formed between the other axial end thereof and an intermediate portion thereof, a first inner ring having an outer peripheral surface formed with a first inner ring raceway thereon and fitted onto the step portion on one end portion thereof, a second inner ring having an outer peripheral surface formed with a second inner ring raceway thereon and fitted onto the step portion on the other end portion thereof, an outer ring having an inner peripheral surface formed with a first outer ring raceway opposed to the first inner ring raceway and a second outer ring raceway opposed to the second inner ring raceway and an outer peripheral surface formed with a second flange, a plurality of rolling elements provided between the first outer ring raceway and the first inner ring raceway and between the second outer ring raceway and the second inner ring raceway, the hub having a cylindrical portion provided at the other axial end portion thereof so as to be projected from the second inner ring fitted onto the other end portion of the step portion; the cylindrical portion being crimped radially outwards to form a crimped portion, such that the first and second inner rings fitted onto the step portion are retained onto the step face of the step portion by the crimped portion, whereby the first and second inner rings fitted onto the step portion are securely fixed to the hub.

In this rolling bearing unit, since the hub itself is not formed with the inner ring raceway, the hub can be made of a carbon steel containing carbon less then 0.45 weight % for easy formation of the crimped portion. However, at least a portion of the step portion of the hub including the step face is hardened by quenching. Accordingly, the step face of the step portion for clamping together with the crimped portion the first and second inner rings fitted onto the step portion, and the one end portion of the step portion subject to stress concentration during use of the rolling bearing unit can securely have enough strength and durability.

As to the cylindrical portion and first and second inner rings, the description for the first feature should be taken into consideration.

Now, some examples of the present invention are explained referring to the attached drawings.

FIGS. 1 to 4 show a first example of the embodiments of the present invention.

The rolling bearing unit 1 comprises a hub 2 which is a first inner ring member an inner ring 3, an outer ring 4, and a plurality of rolling elements 5. The hub 2 has an outer peripheral surface which is formed with a first flange 6 closer to the axially outer end thereof to support a vehicle wheel, with a first inner ring raceway 7 at an intermediate portion thereof, and with a step portion 8 with a smaller outer diameter at the axially inner end thereof, respectively. The hub 2 is made of a carbon steel material containing carbon in an amount of from 0.45 weight to 1.10 weight % and integrally formed through forging.

One portion of the outer peripheral surface of the hub 2, illustrated with cross hatching in FIG. 1, including the first inner ring raceway 7, the base portion of the first flange 6, and the base half portion of the step portion 8 has been subjected to quench hardening such as induction hardening, carburizing-quenching, laser quenching, to make the hardness of this portion higher to the order of from Hv 550 to Hv 900. Incidentally, with quenching processes above, the induction hardening is desirable due to its lower process cost. On the other hand, the cost of the carburizing-quenching is high because plating treatment for preventing carburizing is required to the portion which must not be hardened. The equipment cost of the laser quenching is high.

With the portion illustrated with cross hatching in FIG. 1, subjected to quenching, the portion of the first inner ring raceway 7 is exposed to a large face pressure based on the contact with the rolling surface of the rolling elements 5, and therefore hardened to secure the rolling fatigue life.

The base portion of the first flange 6 is hardened to prevent the base portion from being deformed regardless of the moment load exerted from the first flange 6 with the vehicle wheel fixed thereto.

With the base half portion of the step portion 8, an outer peripheral surface portion of the step portion 8 is hardened to prevent the outer peripheral surface from being deformed, and to prevent fretting wear from being produced on the outer peripheral surface of the step portion 8 fitted with the inner ring 3, regardless of the radial load exerted from the rolling elements 5 to the inner ring 3 and the fitting pressure of the inner ring 3.

The portion of the step face 12 of the step portion 8 is hardened to prevent the step face 12 from being deformed, and to prevent fretting wear from being produced on the step face 12 of the step portion 8 in contact with the axially outer end face of the inner ring 3, regardless of the axial load applied to the inner ring 3 because of the crimping described later.

The portion or the corner R for connecting the outer peripheral surface of the step portion 8 to the step face 12 is hardened to prevent it from being deformed due to stress concentration. Incidentally, it is desirable that the radius of curvature in cross section of the portion of the corner R is controlled in the range 2.5 mm=1.5 mm.

If the radius of curvature of this portion is less than 1 mm, flaws such, as crack due to stress concentration would be produced. On the contrary, if the radius of curvature of this portion is larger than 4 mm, this portion is inclined to interfere with the inner peripheral edge portion of the inner ring 3, so that it is hard to achieve the smooth operation of the rolling bearing unit.

The axial position of the axially inner end of the quench hardened layer as shown with cross hatching (the point X in FIG. 1) is located axially inward (right side in FIG. 1) than the axial position (the point Y in FIG. 1) of the center of the rolling elements 5 disposed around the inner ring 3 and axially outward (left side in FIG. 1) than the axial position (the point z in FIG. 1) of the base end of the crimped portion 19 described later. At the base end of the crimped portion 19, the outer diameter of the crimped portion 19 starts to be larger than the outer diameter of the step portion 8.

The reason of thus limiting the position of the axially inner end of the quench hardened layer is as follows;

Enlarging the surface area of the quench hardened layer in the outer peripheral surface portion of the step portion 8 as much as possible, making the processing of the crimped portion 19 easier, and preventing flaws such as crack from being produced in the crimped portion 19 due to the existence of the quench hardened layer.

Incidentally, the quench hardened layer can be discontinuously formed in the required portions, but as shown in FIG. 1, the adjacent quench hardened layers can be continued to improve the strength and endurance of the hub 2.

Formed on the axially inner end portion of the hub 2 is a cylindrical portion 20 where the crimped portion 19 is provided to affix the inner ring 3 thereto. In the example illustrated, the thickness of the cylindrical portion 20 becomes smaller as it is closer to the tip end in the state before crimping out the cylindrical portion 20 radially outwards. Therefore, in this example, a tapered hole 21 is formed in the axially inner end portion of the hub 2 such that its inner diameter becomes smaller as it is closer to the recessed portion 21a.

The inner ring 3 is made of a high carbon steel such as high carbon chromium bearing steel e.g. SUJ 2 and quench hardened to the core.

The carbon amount in the carbon steel for the hub 2 is controlled in the range of from 0.45 weigh % to 1.10 weight t as mentioned above. At least the cylindrical portion 20 formed in the other axial end portion of the hub 2 has a hardness in the range of Hv 200 to Hv 300 before being crimped as in FIG. 3.

By meeting such conditions, the hardness of from Hv 550 to Hv 900 required for the portion of the first inner ring raceway 7 is secured, and the process of crimping out the cylindrical portion 20 is sufficiently carried out.

If the hardness of the cylindrical portion 20 exceeds Hv 300 upon crimping out the cylindrical portion 20 to form the crimped portion 19, cracks would occur in the crimped portion 19, and due to insufficient crimping, the crimped portion 19 would not be tightly connected to the inner ring 3, so that the clamping force of the inner ring 3 with respect to the hub 2 is small. In addition, the load required to form the crimped portion 11 would be excessively large, so that during crimping, flaws such as indentations are inclined to be produced on the raceways and rolling elements 5, which may lead to poor size precision in the parts. In addition, the hub 2 would be difficult to machine. Specifically, the machining time would be longer and the tool life would be shortened, and the cost may be increased.

If the carbon amount in the carbon steel for the hub 2 exceeds 1.10 weight %, it would be difficult to control the hardness of the cylindrical portion 20 up to Hv 300. Therefore, the upper limit of carbon amount in the carbon steel for the hub 2 is 1.10 weight %.

On the contrary, if the hardness of the cylindrical portion 20 does not reach Hv 200, the hardness in the crimped portion 19 formed by crimping the cylindrical portion 20 could not be secured, so that the force of the crimped portion 19 for clamping the inner ring 3 would be insufficient.

If the carbon amount in the carbon steel for the hub 2 does not reach 0.45 weight %, it could not secure the hardness from Hv 550 to Hv 900 required to the portion of the first inner ring raceway 7, so that the life of the portion of the first inner ring raceway 7 would be reduced. Accordingly, the lower limit of carbon amount in the carbon steel for the hub 2 is 0.45 weight %.

The hub 2 is formed by forging the carbon steel containing carbon in the amount of from 0.45 weight % to 1.10 weight % as mentioned above, where there is no need of annealing after forging in the case of the carbon amount of from 0.45 weight % to 0.60 weight %. Specifically, since the cooling rate after forging is simply controlled, so that the hardness of at least the cylindrical portion 20 can be limited in the range of Hv 200 to Hv 300. Consequently, after the hub 2 is formed by forging, the process for providing the cylindrical portion 20 with the crimped portion 19 can be carried out without annealing, and so the rolling bearing unit for vehicle wheel support with the crimped portion 19 provided therein can be produced at a lower cost.

On the other hand, when the carbon steel for the hub 2 contains carbon in the amount range of from 0.60 weight % to 1.10 weight %, there is the need of annealing after forming the hub 2 by forging. Specifically, even when the carbon steel for the hub 2 contains carbon in the amount range of from 0.60 weight % to 1.10 weight %, it is possible that the hardness of the cylindrical portion 20 is provided in the degree of Hv 200 to Hv 300 by controlling the cooling rate after forging. However, the cooling rate must be substantially small, that is slow cooling, a long process time is required, and the apparatus only for it is required. It will be noted that annealing is more desirable than controlling the cooling rate from the point of high production efficiency and simple production equipment.

In addition, once the annealing is carried out, quenching the portions of the hub 2 to be quenched is well carried out. Therefore, by annealing the hub 2 produced by forging, the hardness of at least the cylindrical portion 20 is provided in the degree of Hv 200 to Hv 300.

Incidentally, when the carbon steel for the hub 2 contains carbon in the amount range of from 0.60 weight % to 1.10 weight %, if the cooling rate after forging is not small, unless annealing is carried out, similar problems would occur as in the case where the carbon content in the carbon steel exceeds 1.10 weight %. It should be noted that in the case where the carbon content in the carbon steel exceeds 1.10 weight %, even if the cooling rate after forging is made small, or even if the annealing is carried out, it would be difficult to limit the hardness of the cylindrical portion 20 up to Hv 300.

Figure 2:
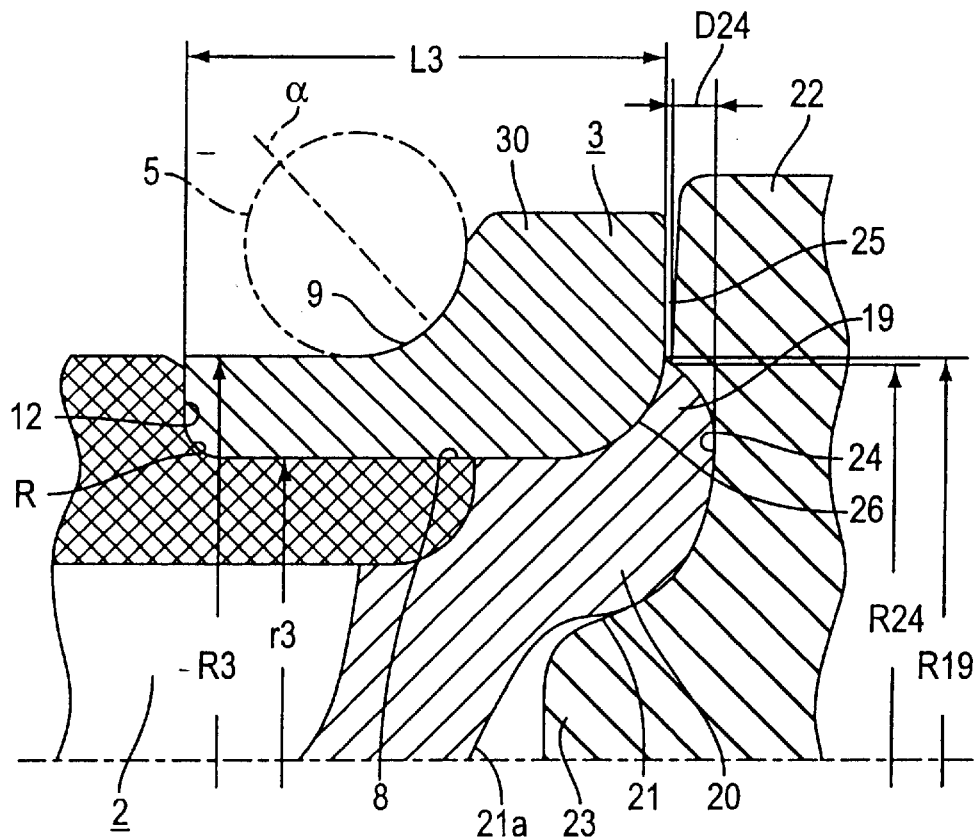
FIG. 2 is a cross sectional enlarged view of a part of the structure of the first example of FIG. 1 where the axially inner end portion of the hub is crimped to securely mount the inner ring upon production.

In order to crimping out the tip end portion of the cylindrical portion 20 to affix the inner ring 3 to the axially inner end portion of the hub 2, in the state where the hub 2 is fixed so as not to be axially displaced, as shown in FIG. 2, a die 22 is strongly pressed to the tip end portion of the cylindrical portion 20.

The die 22 has a tip end face (left end face in FIG. 2) the center of which is formed with a land portion 23 of frustum shape which can be forced into the cylindrical portion 20. Generally formed around the land portion 23 is a recess portion 24 which has an arcuate shape in cross section. The cross section shape and the outer diameter $R_{24}$ and the depth $D_{24}$ of the recess portion 24 are limited, such that upon plastic deformation of the cylindrical portion 20 to form the crimped portion 19, the crimped portion 19 has a predetermined shape and size under a compression force applied to the carbon steel for the cylindrical portion 20.

Specifically, the cross section of the recess portion 24 is formed in a complex curve shape, such that the crimped portion 19 obtained by plastically deforming the tip end portion of this cylindrical portion 20 with the recess portion 24 of the die 22 has a cross section shape such that the thickness becomes smaller in size from the base end portion to the tip end potion, and that at the tip end portion, the thickness changes largely to a small size, and that the radius of curvature becomes smaller as it is closer to the outer diameter side.

The outer diameter $R_{24}$ is the same to the outer diameter Rig of the crimped portion 19 or slightly smaller than the outer diameter $R_{19}$ of the crimped portion 19. That is, $R_{24} \leq R_{19}$.

The depth $D_{24}$ is limited, such that in the state where the tip end portion of the cylindrical portion 20 is clamped between the die 22 and the inner peripheral surface at the axially inner end portion and the inner end face of the inner ring 3 to form the crimped portion 19, a clearance 25 is remained between the tip end portion of the die 22 and the axially inner end face of the inner ring 3.

When the die 22 having the land portion 23 and recess portion 24 with the above shape and size is pushed to the tip end portion of the cylindrical portion 20, the tip end portion of the cylindrical portion 20 is crimped in a diametrically outward direction to form the crimped portion 19.

The inner ring 3 is supported between the crimped portion 19 and the step face 12 of the step portion 8 formed at the axially inner end portion of the hub 2 to affix the inner ring 3 to the hub 2.

In the case of the example illustrated, at the final step where the crimped portion 19 is formed by plastically deforming the axially inner end face of the cylindrical portion 20, the outer diameter face of the crimped portion 19 is placed under a compressed stress condition in a circumferential direction. Accordingly, the flaw such as crack Is effectively prevented from occurring along the outer peripheral edge portion of the crimped portion 19.

A curved surface portion 26 with an arcuate cross section is formed on the peripheral edge portion at the axially inner open portion of the inner ring 3 to which the outer peripheral surface at the base end portion of the crimped portion 19 is abutted. Accordingly, the radius of curvature of the base end portion of the crimped portion 19 could not be small, and therefore any unjust stress is hardly applied to the base end portion.

In the case of the rolling bearing unit for vehicle wheel support, the carbon amount in the carbon steel for the hub 2 is controlled in the range of from 0.45 weight % to 1.10 weight %, and the portion of the first inner ring raceway 7 is hardened by way of quenching, and therefore the rolling fatigue life in the surface of the portion of the first inner ring raceway 7 is sufficiently secured regardless of loads repeatedly exerted from the rolling elements 5, On the other hand, the cylindrical portion 20 is kept as it is formed or forged without being subjected to quenching. Accordingly, the force for plastic deformation in the cylindrical portion 20 is not unjustly large, and flaws such as crack are not inclined to occur in the cylindrical portion 20 when the plastic deformation is carried out in the cylindrical portion 20. Accordingly, even when the hardness of the portion of the first inner ring raceway 7 is made high to secure the rolling fatigue life in the surface of the portion of the first inner ring raceway 7, the process for the crimped portion 19 to connect the hub 2 to the inner ring 3 is not troublesome.

In addition, the inner ring 3 is made of a high carbon steel such as bearing steel, and the quench hardening is conducted in the inner ring 3 to the core, even if a large load is applied to the inner ring 3 as the crimped portion 19 is formed, the deformation of the inner ring 3 is prevented, and the internal clearance of the rolling bearing unit is prevented from being displaced from the desired value.

In addition, the diameter of the second inner ring raceway 9 formed on the outer peripheral surface of the inner ring 3 is prevented from being changed, and the precision is prevented from being worsened, so that the rolling fatigue life of the second inner ring raceway 9 is prevented from being reduced.

In the case of the example illustrated, the thickness of the cylindrical portion 20 where the crimped portion 19 is formed becomes smaller as it is closer to the tip end edge, and therefore even if the hub 2 is made of a carbon steel in the carbon content range of 0.45 weight % to 1.10 weight %, the force is not unjustly large in forming the crimped portion 19 in the tip end portion of the cylindrical portion 20 by way of plastic deformation with the die 22 as mentioned above. Accordingly, the force is securely prevented from exerting in a degree to cause any flaws such as crack in the crimped portion 19 during crimping, or to apply so a large force to the inner ring 3 fixed by crimped portion 19 to substantially change the diameter of the inner ring 3 to affect the preload and durability such as rolling fatigue life.

In the case of the example illustrated, a compression stress is applied to the tip end portion of the crimped portion 19, and the radius of curvature on the base end portion of the crimped portion 19 is large, and so any damage on the crimped portion 19 is effectively prevented.

Incidentally, the opening at the axially outer end of the space 27 where the rolling elements 5 are placed is closed by a seal ring 28 while the opening at the axially inner end is closed by a cover 29 to prevent foreign matter from penetrating into the space 27 and lubricant oil etc. from leaking out of the space.

The following is a description on the typical values in size of parts in the construction as illustrated in FIGS. 1 to 4, in the case of the rolling bearing unit for vehicle wheel support installed in generally used automobiles, specifically the inner diameter $r_3$ of the inner ring 3 affixed to the hub 2 is from about 20 mm to about 60 mm, the length $L_3$ of the inner ring 3 is about 15 mm to about 40 mm, the hub 2 is made of a Carbon steel containing carbon in the range of from 0.45 weight % to 1.10 weight %, and the inner ring 3 is made of a high carbon chromium bearing steel such as SUJ 2.

First, the thickness $t_{20}$ of the tip end portion of the cylindrical portion 20 before the crimped portion 19 is formed is desirably in the range of from 1.5 mm to 5 mm.

The thickness $T_{20}$ of the base end portion of the cylindrical portion 20 is desirably in the range of from 5 mm to 10 mm.

By limiting the thickness $t_{20}$ of the tip end portion and the thickness $T_{20}$ of the base end portion of the cylindrical portion 20 in the ranges, flaws such as crack are prevented from occurring in the crimped portion 19, while securing the support rigidity for the inner ring 3 with the crimped portion 19.

In other words, the tip end portion of the cylindrical portion 20 where the deformation degree is large is made thin for easy plastic deformation, so that flaws such as crack are effectively prevented from occurring. Further, the base end portion of the cylindrical portion 20 to be utilized to retain the inner ring 3 against the step face 12 is made to be thick, so as to sufficiently secure the support strength for the inner ring 3.

The length $L_{20}$ of the cylindrical portion 20 is desirably 8 mm to 20 mm. If the length $L_{20}$ of the cylindrical portion 20 is less than 8 mm ($L_{20}<8$ mm), the crimped portion 19 is not well formed, or flaws such as crack are inclined to be produced in part of the crimped portion 19 upon crimping on the other hand, if the length $L_{20}$ of the cylindrical portion 20 is larger than 20 mm ($L_{20}>20$ mm), the length of the hollow portion existing in the axially inner end portion of the hub 2 is too long, so that the strength of the hub 2 is lowered, and the axially inner end portion of the hub 2 can be easily deformed due to the radial load applied to the inner ring 3.

Incidentally, the process where the crimped portion 19 is formed through plastic deformation of the cylindrical portion 20 with the sizes limited as mentioned above is desirable carried out by forging or oscillation pressing.

The line of action of he load applied to the inner ring 3 from the rolling elements 5 coincides with the dotted line a in FIG. 2 indicating the contact angle of the rolling elements 5 and is limited to pass through the fitting face between the inner peripheral surface of the inner ring 3 and the step portion 8 and not through the crimped portion 19. This limitation is because the load is made not to work as the force to directly deform the crimped portion 19 radially inwards, thereby preventing the crimped portion 19 from being deformed or from being damaged.

Figure 3:
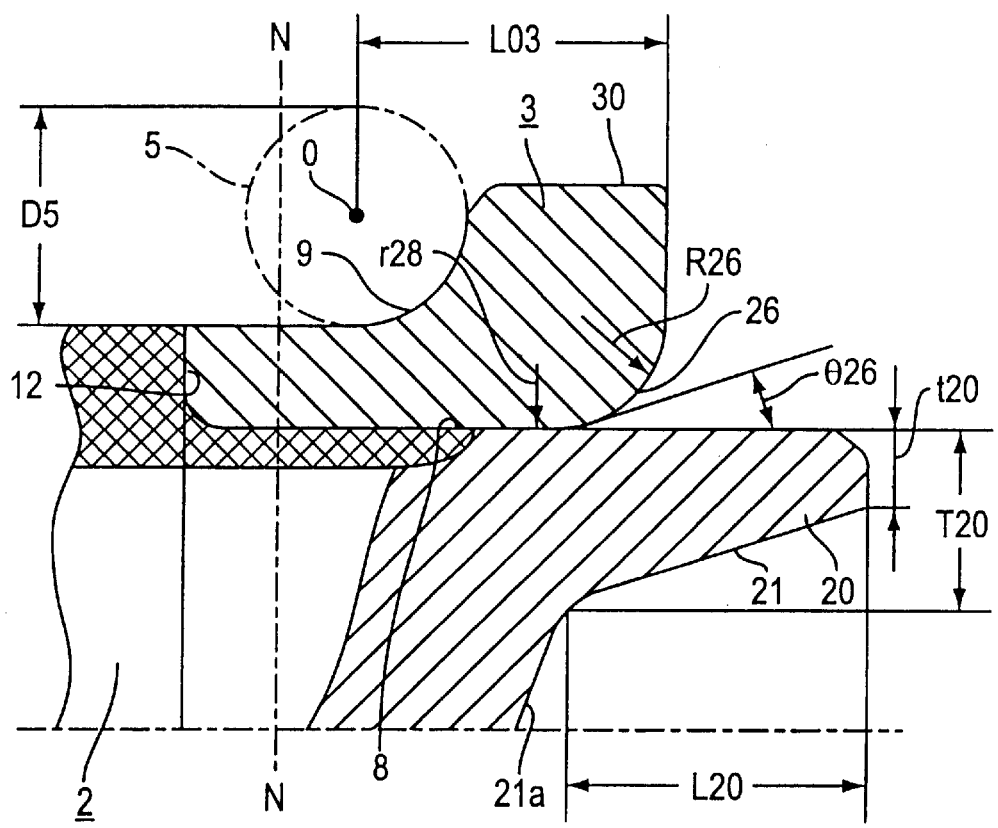
FIG. 3 is a cross sectional enlarged view of a part of the structure of the first example of FIG. 1 where the axially inner end portion of the hub is shown before being crimped.
Figure 4:
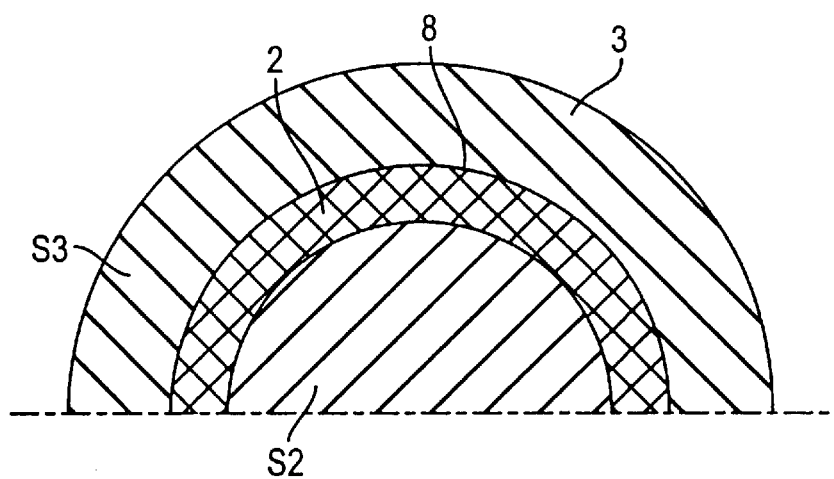
FIG. 4 is a cross sectional view taken along the line IV—IV of FIG. 3.
Figure 5:
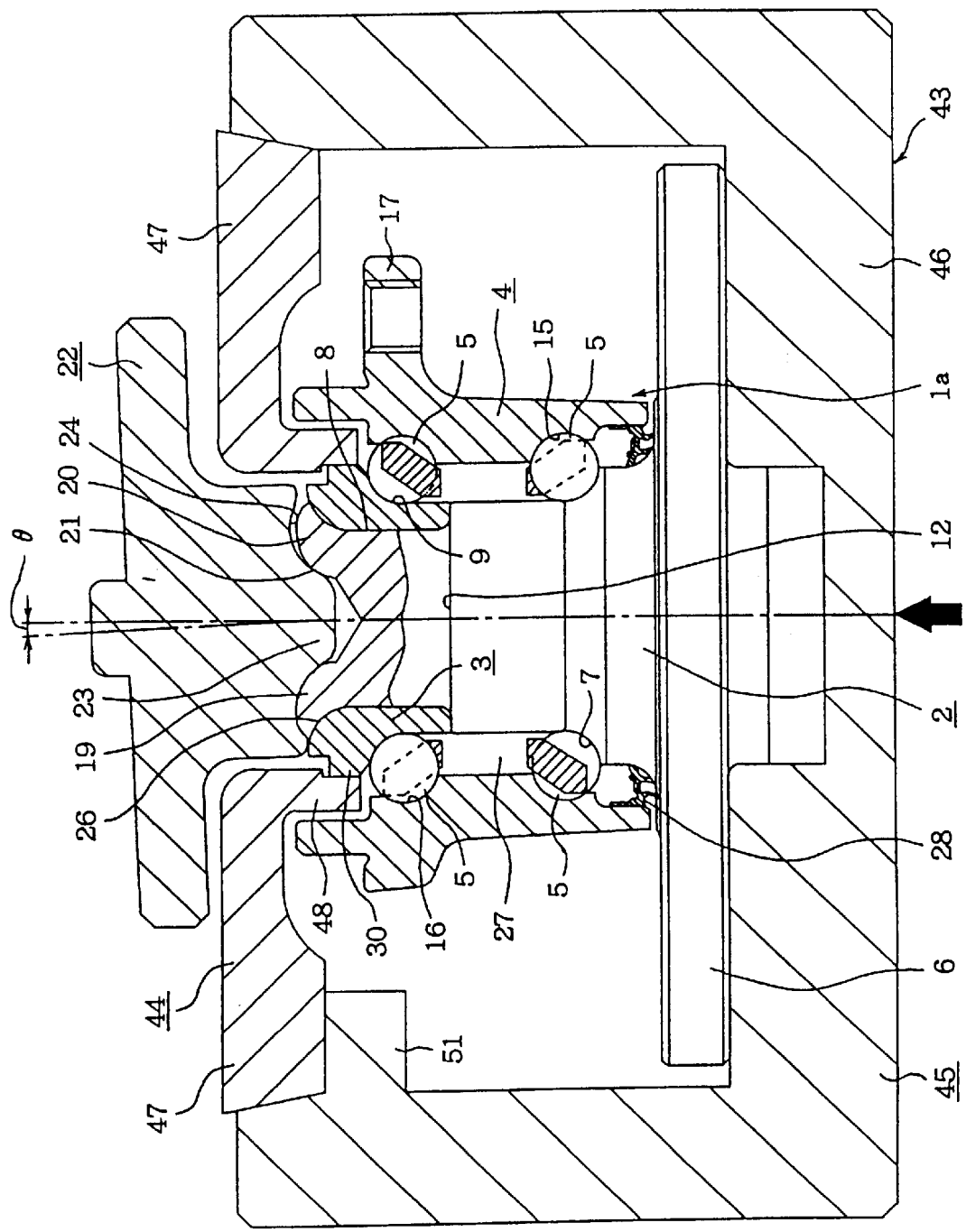
FIG. 5 is a vertical cross sectional view of a main portion of the oscillating press.
Figure 6:
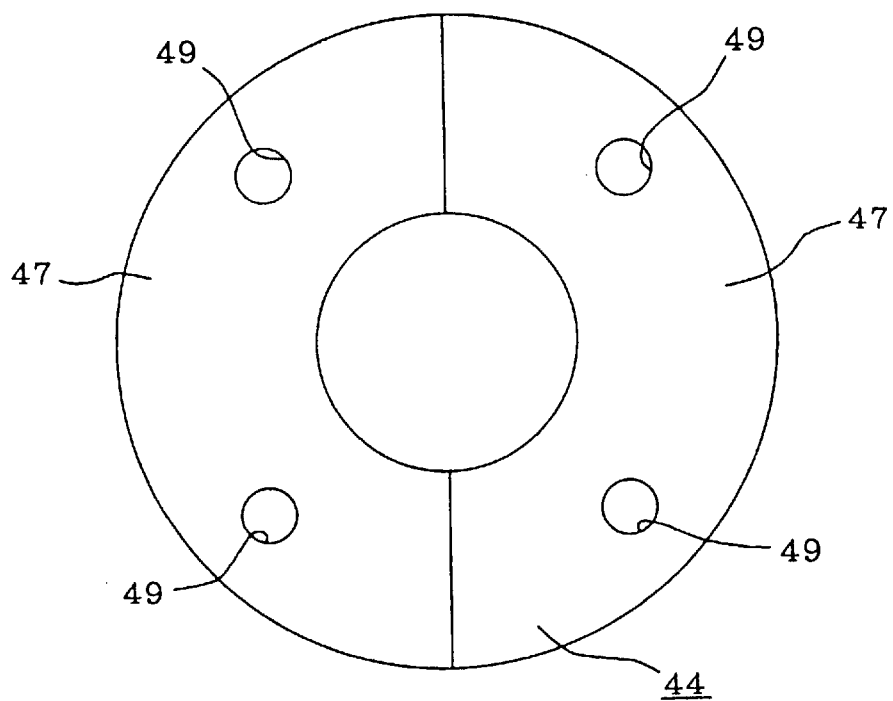
FIG. 6 is a plan view of the retaining jig to be installed in the oscillating press.

With reference to the relation between the cross sectional area $S_3$, the portion along the line IV—IV in FIG. 3, of the inner ring 3 at a location closer to the axially outer side than the second inner raceway 9 and the cross sectional area $S_2$ of the hub 2 at the same location, $S_3$ is smaller than $S_2$, that is ($S_3 < S_2$), and desirably $S_3 \leq 0.94\ S_2$.

This limitation is provided on the cross section of the parts in order to secure the support strength for the inner ring 3 with respect to the hub 2.

In the state where the inner ring 3 is held between the crimp portion 19 and the step face 12, the inner ring 3 is axially pushed by a force (axial force) to prevent the rotation of the inner ring 3, and this axial force is determined by the difference of strain along the axial direction of the hub 2 and the inner ring 3. Specifically, during crimping, the amount of elastic deformation of the inner ring 3 is larger than that of the hub 2. After crimping, the hub 2 and the inner ring 3 elastically restore to apply the axial force to the inner ring 3. The material for the inner ring 3 and the material for the hub 2 have substantially the same modulus of elasticity, the amount of elastic deformation during crimping the inner ring 3 is larger than that of the hub 2 under the condition of $S_3 < S_2$.

Accordingly, with the limitation of the cross sectional area of the parts, a sufficient compression load is applied to the inner ring 3 to efficiently prevent the creep that is, rotation of the inner ring 3 with reference to the hub 2 from occurring.

Next, in the case where the rolling elements 5 around the inner ring 3 are balls, the distance $L_{03}$ between the center O of the rolling elements 5 and the axially inner end face of the inner ring 3 is desirably equal to or larger than 0.75 times the diameter $D_5$ of the rolling elements 5 ($L_{03} \geq 0.75\ D_5$). The relatively larger distance $L_{03}$ must be secured because it is prevented that the diameter of the portion of the second inner ring raceway 9 in contact with the rolling surface of the rolling elements 5 becomes larger during forming the crimped portion 19 and that the precision (roundness, cross section shape) is worsened during forming the crimped portion 19. Specifically, if this distance $L_{03}$ is too short, the base end portion of the crimped portion 19 exists in the portion on the inner diameter side of the second inner ring raceway 9, and therefore during forming the crimped portion 19, the diameter of the portion of the second inner ring raceway 9 would become so larger as not to be neglected, and the precision would be worsened.

The outer diameter $R_{19}$ of the crimped portion 19 is a desirably limited with respect to the inner diameter $r_3$ of the inner ring 3 and the outer diameter $R_3$ of the axially outer end portion of the inner ring 3 away from the second inner raceway 9 as follows;

$$r_3+0.7\ (R_3-r_3) \leq R_{19} \leq r_3+1.3\ (R_3-r_3)$$

By limiting the outer diameter $R_{19}$ of the crimped portion 19 in this range, flaws such as crack are prevented from occurring in the crimped portion 19, and the support strength for the inner ring 3 with respect to the hub 2 is positively secured.

If the outer diameter $R_{19}$ of the crimped portion 19 is out of the range to be larger, flaws such as crack would be inclined to occur in the crimped portion 19, while if the outer diameter $R_{19}$ of the crimped portion 19 is out of the range to be smaller, the support strength for the inner ring 3 with respect to the hub 2 is hardly secured.

In addition, the shape in cross section of the curved surface portion 26 is desirably limited as follows;

First, an inclined surface portion is provided closer to the start point of the curved surface portion 26, and the angle $\theta_{26}$ of the inclined surface portion with respect to the central axis of the inner ring 3 is in the range of from 10 degrees to 45 degrees, and the radius of curvature $r_{26}$ of the portion to connect the inner peripheral surface of the inner ring 3 continuously to the inclined surface portion is in the range of from 2 mm to 8 mm. In addition, the radius of curvature $R_{26}$ of the portion to connect the inclined surface portion continuously to the end face of the inner ring 3 is in the range of from 3 mm to 10 mm.

By limiting the shape in cross section of the curved surface portion 26 as mentioned above, excessive stress would not occur in the base end portion of the crimped portion 19 during forming the crimped portion 19 by plastic deformation of the cylindrical portion 20, and the base end portion is prevented from being damaged.

It is desirable that the operation to form the crimped portion 19 by plastic deforming, that is by crimping out the cylindrical portion 20, is conducted using the oscillation press apparatus 43.

The oscillation press apparatus 43 comprises a die 22, a retaining jig 44 and a holder 45. The holder 45 is made of a metal material with a sufficiently large rigidity and formed in a bottomed cylindrical shape. The upper surface of the bottom 46 of the holder 45 is formed to be abutted by the external portion of the hub 2 with no play therebetween. The retaining jig 44 comprises jig elements 47 each having a semi circular arc shape combined to form a generally circular shape, the inner peripheral edge portion of which is provided with a cylindrical retaining portion 48. The outer peripheral edge portion of the jig elements 47 and the inner peripheral surface of the opening portion at the upper end of the holder 45 are formed in a tapered shape which is tapered such that the diameter becomes larger from the lower side to the upper side. With a bolt (not shown) extending through the holes 49, the jig elements 47 are securely connected to the mount portion 51 provided on the inner peripheral portion of the holder 45 at its upper portion. In this process, the jig elements 47 are displaced radially inwards based on the taper face engagement as mentioned above. The inner peripheral surface of the retaining portion 48 of the retaining jig 44 having the jig elements 47 is strongly pushed on the outer peripheral surface of the inner ring 3. In this structure, the retaining jig 44 can retain sufficiently strongly the inner ring 3 even when the outer diameter of the inner ring 3 is varied within the range of the tolerance (about 50 μm).

When the cylindrical portion 20 is crimped to form the crimped portion 19, the hub 2 is pushed upward with the holder 45 to rotate the die 22 in an oscillation manner.

Specifically, with the canter axis of the die 22 tilted with reference to the central axis of the hub 2 by an angle θ, this die 22 is rotated around the central axis of the hub 2.

When the crimped portion 19 is formed with the oscillation press 43, a circumferential portion of the die 22 is urged to push the cylindrical portion 20, and then the process of crimping for the crimped portion 19 is carried out portion by portion successively in a circumferential direction. Accordingly, comparing with case where the usual forging process is used for providing the crimped portion 19, the load applied to the cylindrical portion 20 upon processing can be small.

Incidentally, due to the retaining jig 44, it is prevented hat the hub 2 is swung upon processing the crimped portion 19 with the die 22, and that the size and shape precision of the construction parts such as raceway, rolling elements 5 are worsened.

The tilting angle or oscillation angle θ of the die 22, oscillation rotating speed, pressing load, etc. are determined on design depending on the size etc, of the rolling bearing unit for vehicle wheel support having the crimped portion 19 to be processed. For example, in the case of the rolling bearing unit for general automobiles, they are determined as follows.

First, the tilting angle θ is desirable in the order of from 0.5 degrees to 5.0 degrees. When the tilting angle is less than 0.5 degrees, the load to plastically deform the cylindrical portion 20 to form the crimped portion 19 would be so large to worsen the size precision and shape precision in the raceway and rolling surface and to produce indentations etc. On the contrary, when the tilting angle θ exceeds 5 degrees, the hub 2 would be inclined to swing in a diametrical direction upon forming the crimped portion 19 by way of the plastic deformation of the cylindrical portion 20, so that the retaining jig 44 could not afford to sufficiently support the hub 2, and therefore the size precision and shape precision in the raceway and rolling surface would be worsened and indentations etc. would be produced.

The oscillation rotating'speed is desirable in the order of 100 rpm (min$^{-1}$) to 500 rpm (min$^{-1}$). If the oscillation rotating speed is less than 100 rpm, the process time would be unjustly long. On the contrary, if the oscillation rotating speed is exceeds 500 rpm, the resulting crimped portion 19 would be hardened so as to be subject to damages such as crack.

The pressing load is desirable in the order of 15t to 50t. If the pressing load is less than 15t, it could not afford to sufficiently provide plastic deformation in the cylindrical portion 20 and to obtain the good crimped portion 19, so that the connecting strength between the inner ring 3 and the hub 2 would be insufficient. On the contrary, if the pressing load exceeds 50t, the size precision and shape precision in the raceway and rolling surface would be worsened and indentations etc. would be produced.

Incidentally, the function and effects of the crimped portion 19 formed by the oscillation press apparatus 43 are obtained regardless of the kinds of the metallic materials for the hub 2 and inner ring 3.

Figure 7:
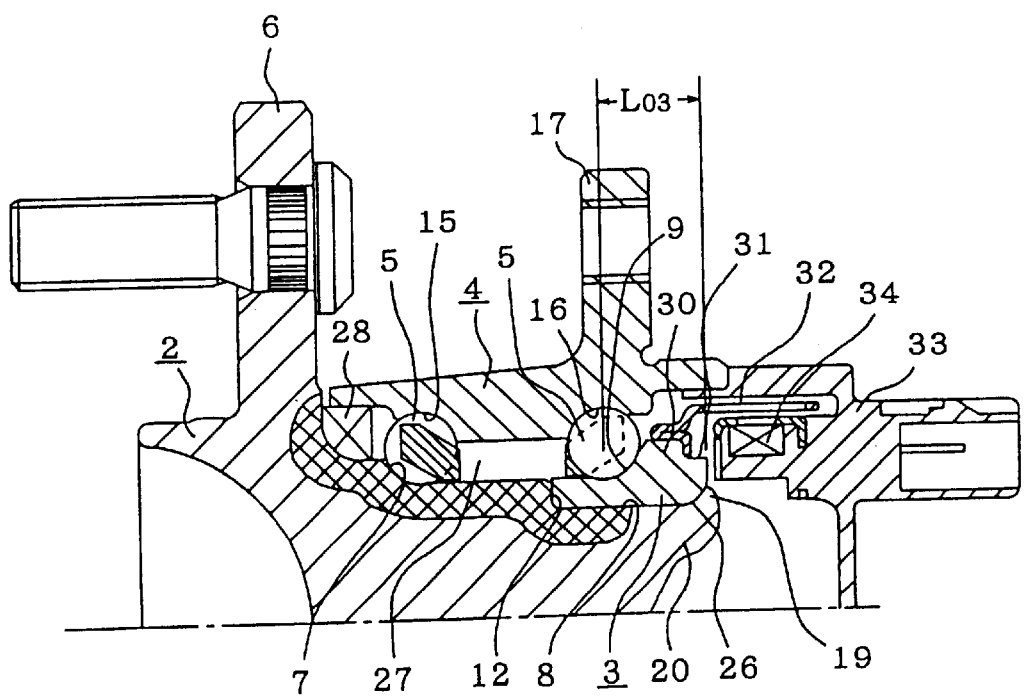
FIG. 7 is a cross sectional view of a half portion of the rolling bearing unit according to a second example in the embodiments of the present invention.

FIG. 7 shows a second example of the embodiments of the present invention, where the present invention is applied to the rolling bearing unit for vehicle wheel support provided with a rotating speed sensor so as to detect the rotating speed of the wheel.

Therefore, in this example, the axially inner end portion of the inner ring 3 is formed with a step portion 31 having a diameter smaller than the shoulder portion 30 of the inner ring 3 and projecting axially inward than the shoulder portion 30. Securely fitted onto the shoulder portion 30 is a tone wheel 32, specifically the base end portion (left end portion in FIG. 7) of the tone wheel 32 which constitutes a rotating speed detecting device.

A portion of the tone wheel 32 is abutted to the inner end Lace of the shoulder portion 30 around the base end portion (left end portion in FIG. 7) of the step portion 31 for positioning in the axial direction (left and right directions in FIG. 7).

Securely fitted to the opening portion at the axially inner end of the outer ring 4 is a cover 33 which is made of synthetic resin or metal and has the sensor 34 embedded therein so as to be faced to the tone wheel 32, and thus the rotating speed detecting device is constructed.

In the case of this example, the step portion 31 is formed on the axially inner end portion of the inner ring 3 and retained by the crimped portion 19 formed on the axially inner end portion of the hub 2. Accordingly, the axial distance between the crimped portion 19 and the second inner ring raceway 9 formed on the outer peripheral surface of the inner ring 3 becomes longer by the amount of the step portion 31 formed. Consequently, the change in size in the second inner ring raceway 9 when the crimped portion 19 is formed can be kept small. Not only the portion of the second inner ring raceway 9 but also the outer diameter of the shoulder portion 30 can be prevented from being larger. Accordingly, the function of the seal ring and tone wheel can be prevented from being damaged when fitting the seal ring and tone wheel onto the shoulder portion 30 and when bringing the seal lip in sliding contact with the outer peripheral surface of the shoulder portion 30.

Incidentally, in the case where the rolling elements 5 around the inner ring 3 are bells in this example, it is desirable that the distance $L_{o3}$ from the center O of the rolling elements 5 to the inner end face of the second inner ring member 3 is at least 0.75 times the diameter $D_5$ of the rolling elements 5 ($L_{o3} \geq 0.75\ D_5$).

The structure and function of the other portions are the substantially same to those in the first example, and so the like symbols are attached to the like members in the drawing and the description on them is omitted. Incidentally, in this example and the succeeding examples 3 to 11, the portion of the hub hardened by quenching is illustrated with cross hatching in the drawing.

Figure 8:
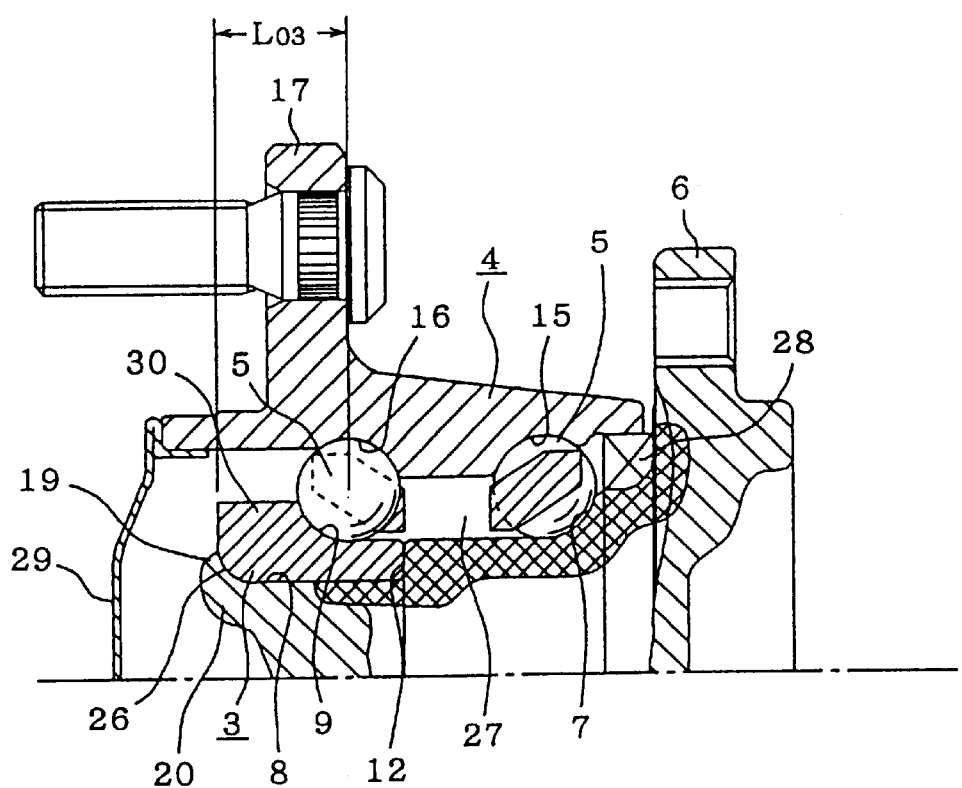
FIG. 8 is a cross sectional view of a half portion of the rolling bearing unit according to a third example in the embodiments of the present invention.

FIG. 8 shows a third example of the embodiments of the present invention, where the outer ring 4 is rotatable, which is different from the first and second examples where the hub 2 is provided within the stationary outer ring 4. Specifically, in this example, the outer ring 4 is rotated together with the vehicle wheel. Except that the rotating side and the stationary side are inverted, inside out, with reference to the diameter direction, so that a portion in the axial direction is inside out, the structure and function of the other portions are substantially the same to those of the first example, and so the like symbols are attached to the like members in the drawing and the description on them is omitted.

Figure 9B:
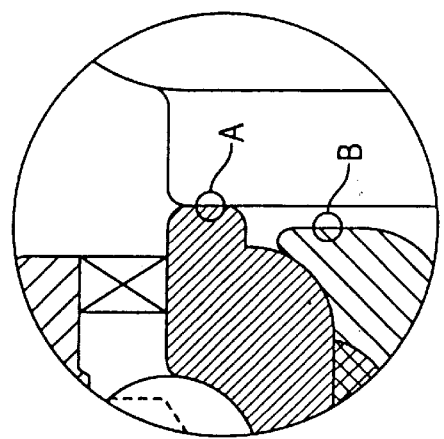
FIG. 9 is a cross sectional view of a half portion of the rolling bearing unit according to a fourth example in the embodiments of the present invention.
Figure 9A:
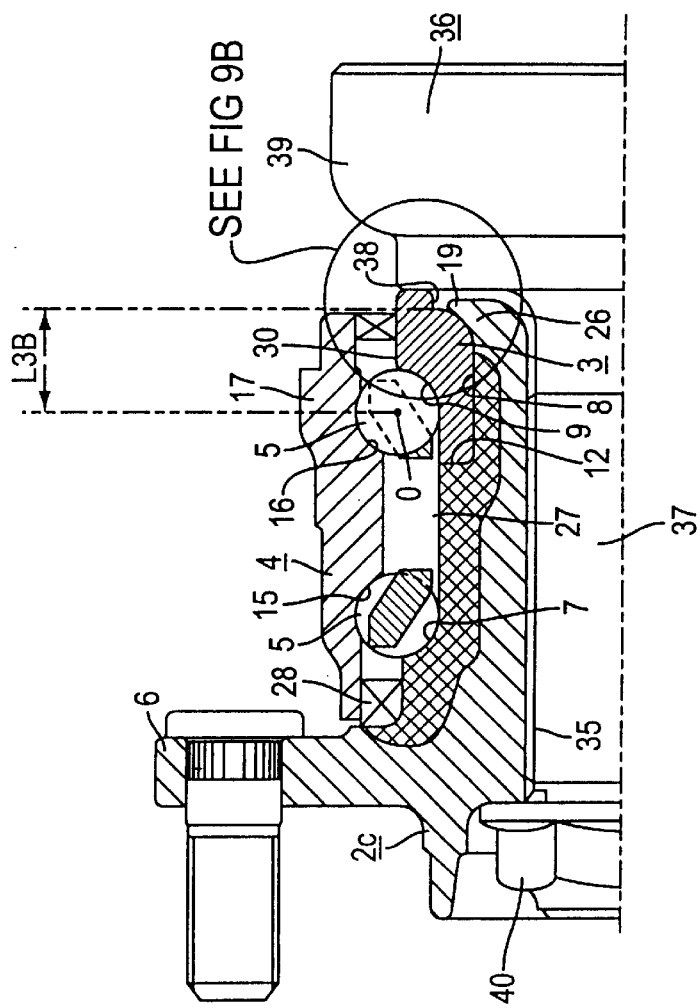

FIG. 9 shows a fourth example of the embodiments of the present invention, where the present invention is applied to the rolling bearing unit for vehicle wheel support to rotatable support a driven wheel (the rear wheels of the FR vehicle and the RR vehicle, and the front wheels of the FF vehicle and all the wheels of the 4WD vehicle), which is different from the first to third examples where the present invention is applied to the rolling bearing unit for vehicle wheel support to rotatably support a non-driven wheel (the front wheels of the FR vehicle and the RR vehicle, and the rear wheels of the FF vehicle).

Accordingly, in the case of this example, the hub 2 is, formed in a cylindrical shape, and a female spline portion 35 is formed on the inner peripheral surface of the hub 2. In addition, inserted into this female spline portion 35 is a drive shaft 37 having an outer peripheral surface on which a male spline portion is formed and connected to the constant velocity joint 36.

On the other hand, a step portion 8 is formed on the outer peripheral surface at the axially inner end portion of the hub 2 and fitted into the inner ring 3, and a step portion 38 is formed on the inner periphery of the inner ring 3 at an axially inner end portion thereof on the inner diameter side. In addition, the crimped portion 19 formed on the axially inner end portion of the hub 2 is crimped toward the step portion 38. In this state, the crimped portion 19 does not project axially inward than the axially inner end face of the inner ring 3. Accordingly, the axially outer end face of the main body 39 of the constant velocity joint 36 is abutted to the axially inner end face of the inner ring 3. Thus, in the state where the axially outer end face of the main body 39 is abutted to the axially inner end face of the inner ring 3, a nut 40 is threaded on the tip end portion of the drive shaft 37 projected from the axially outer end face of the hub 2 and tightened to strongly clamp the inner ring 3 and hub 2 in an axial direction.

In the structure where the rolling elements 5 around the inner ring 3 are balls in this example, it is desirable that the distance $L_{38}$ from the center O of the rolling elements 5 to the step face of the step portion 38 is at least 0.75 times the diameter $D_5$ (see FIG. 3) of the rolling elements 5 ($L_{38} \geq 0.75 D_5$).

The structure and function of the other portions are substantially the same to those of the first example, and so the like symbols are attached to the like members in the drawing and the description on them is omitted.

Incidentally, in the case of the present example, the hub 2 is formed in a hollow cylindrical shape, and therefore it may sometimes be difficult to make the cross section of the hub 2 larger than the cross section of the inner ring 3. However, in the structure of this example, the inner ring 3 is strongly forced to the step face 12 with an axial force based on the clamping of the nut 40 in use, and therefore the force exerted from the inner ring 3 to the crimped portion 19 in the direction to loosen the crimped portion 19 is limited. Accordingly, even if the relationship of the cross sections mentioned above is not satisfied, the durability of the crimped portion 19 would not be damaged.

Figure 10:
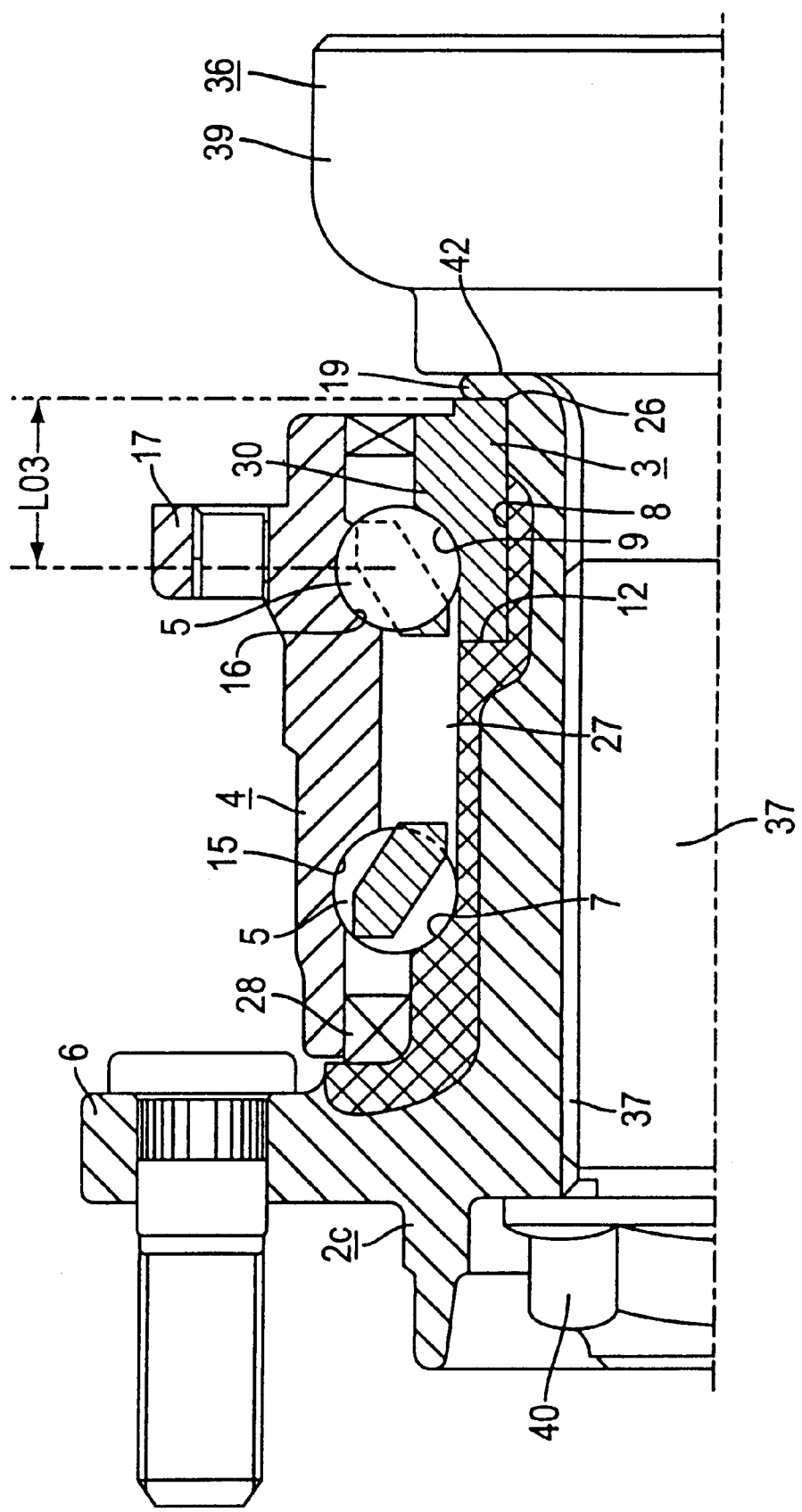
FIG. 10 is a cross sectional view of a half portion of the rolling bearing unit according to a fifth example in the embodiments of the present invention.

FIG. 10 shows a fifth example of the embodiments of the present invention, where the crimped portion 19 formed on the axially inner end portion of the hub 2 is crimped toward the axially inner end face of the inner ring 3 to make the crimped portion 19 project axially inward than the axially inner end of the inner ring 3. The crimped portion 19 is formed with an annular flat surface portion 42 on the side of the axially inner surface, and this flat surface 42 is engaged with the axially outer surface of the main portion of the constant velocity joint 36.

The crimped portion 19 is made of a carbon steel with no heat treatment processed thereto, and since the flat surface portion 42 is engaged with the axially outer surface of the main portion 39 in a large area, and therefore the surface pressure applied to the contact portions, is never high when the nut 40 is tightened. Accordingly, even after long use, there is no permanent set caused in the crimped portion 19, and it is efficiently prevented that the backlash of the nut 40 and he looseness in the portion where the rolling elements 5 are placed are caused due to the permanent set of the crimped portion 19. The structure and function of the other portions are substantially the same to those of the fourth example, and so the like symbols are attached to the like members in the drawing and the description on them is omitted.

Figure 11:
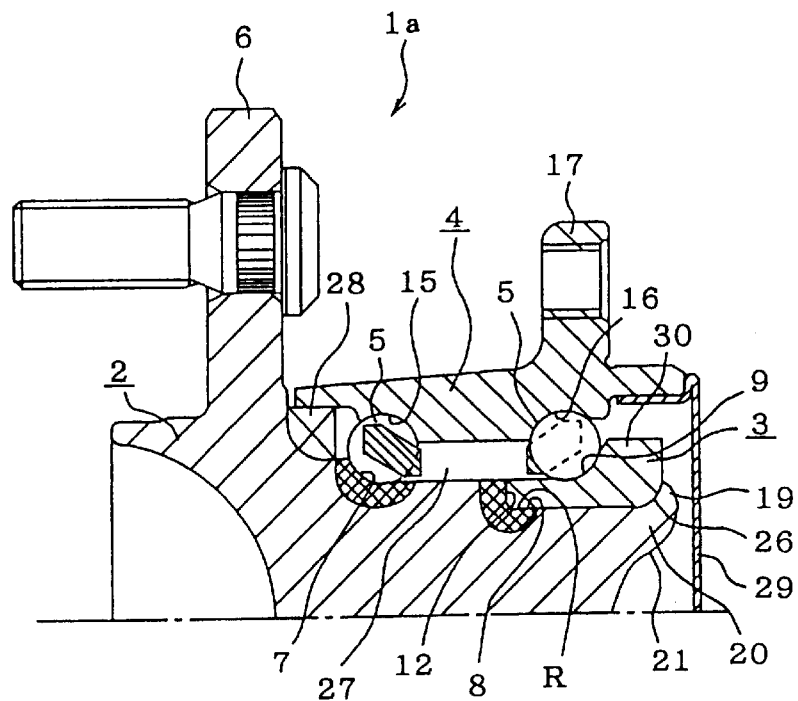
FIG. 11 is a cross sectional view of a half portion of the rolling bearing unit according to a sixth example in the embodiments of the present invention.
Figure 12:
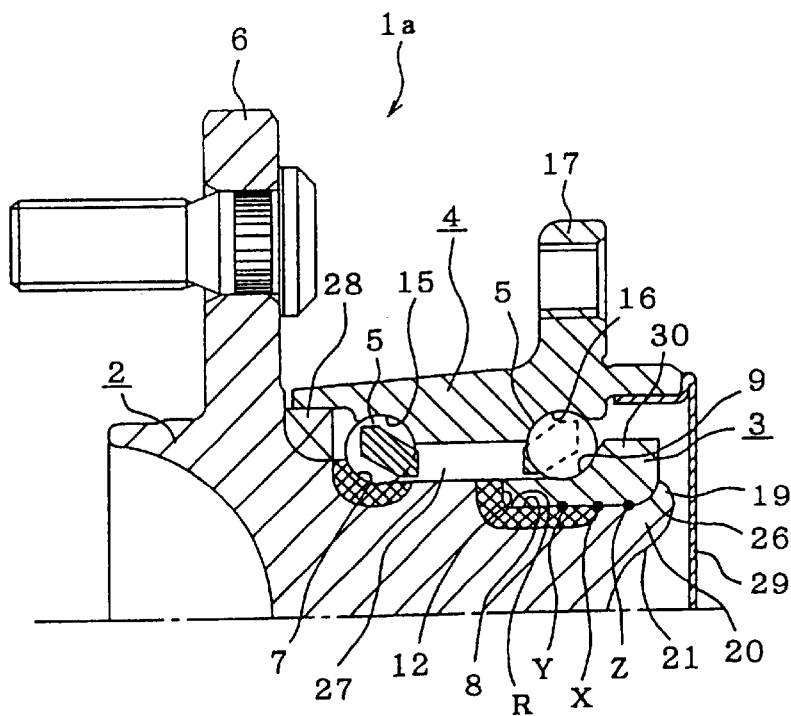
FIG. 12 is a cross sectional view of a half portion of the rolling bearing unit according to a seventh example in the embodiments of the present invention.
Figure 13:
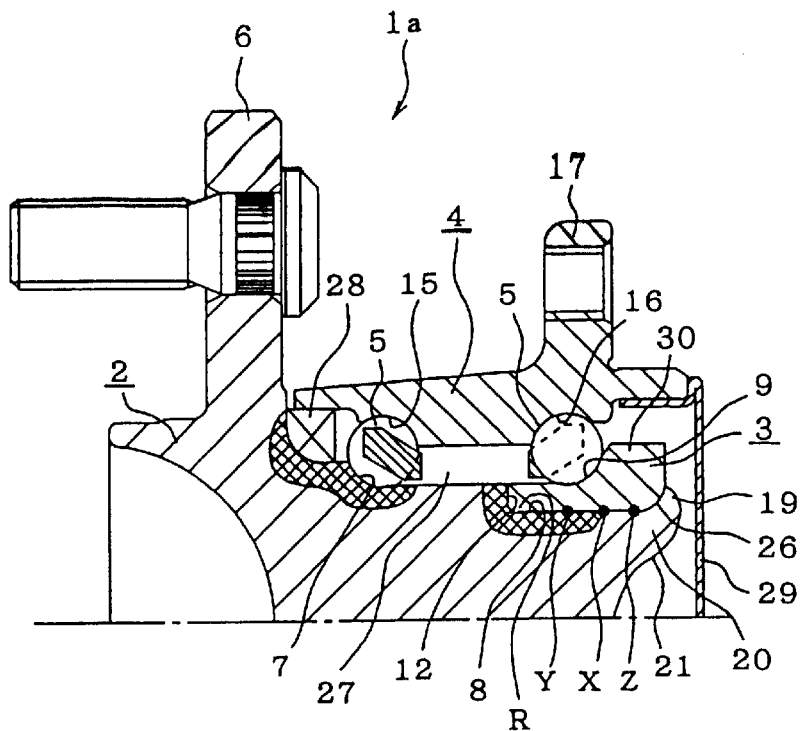
FIG. 13 is a cross sectional view of a half portion of the rolling bearing unit according to an eighth example in the embodiments of the present invention.

FIGS. 11 to 13 show a sixth to eighth examples of the embodiments of the present invention, respectively, where quench hardened layers are discretely provided only in the portions where it is particularly required, which is different from the first to fifth examples where a quench hardened layer is continuously provided in the member where the crimped portion 19 is formed.

Specifically, in the case of the sixth example illustrated in FIG. 11, quench hardened layers are provided only in the portion of the first inner ring raceway 7, the step face 12 and the corner portion R existing closer to the inner periphery of the step face 12. In the case of the seventh example illustrated in FIG. 12, quench hardened layers are provided only in the portion of the first inner ring raceway 7, the step face 12, the corner portion R and the outer peripheral surface of the base half portion of the step portion 8. In the case of the eighth example illustrated in FIG. 13, quench hardened layers are provided only in the portion of the first inner ring raceway 7, the base end portion of the first flange 6, the step face 12, the corner portion R and the outer peripheral surface of the base half portion of the step portion 8.

It should be noted as mentioned above that the strength and durability of the member where the quench hardened layer is formed can be more increased as in the first to fifth examples illustrated in FIGS. 1, 7, 8, 9 and 10 where the adjacent quench hardened layers are continued, than in the case where quench hardened layers are discretely formed only in the portions where it is particularly required. The structure and function of the other portions are substantially the same to those of the first example.

Figure 14:
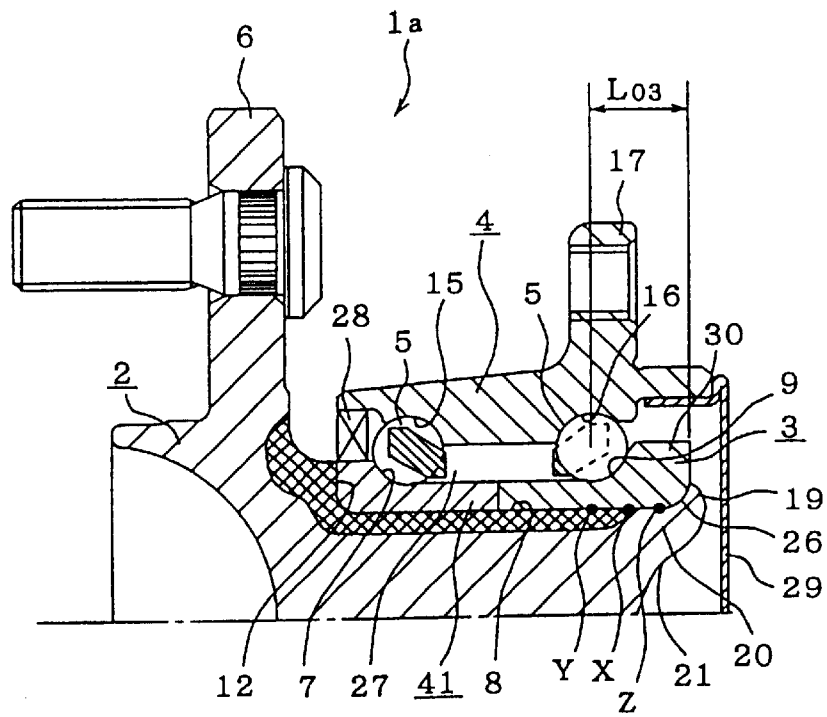
FIG. 14 is a cross sectional view of a half portion of the rolling bearing unit according to a ninth example in the embodiments of the present intention.

FIG. 14 shows a ninth example of the embodiments of the rolling bearing unit for vehicle wheel support in the present invention, where the first and second inner ring raceways 7, 9 are provided on the outer peripheral surface of the first and second inner rings 41, 3 fitted onto the step portion 8 of the hub 2, respectively. The first and second inner rings 41, 3 are made of a high carbon steel such as high carbon chromium bearing steel like SUJ 2 and quench hardened to the core. The first and second inner rings 41, 3 are clamped the crimped portion 19 formed on the axially inner and portion of the hub 2 ad the step face formed on the base portion of the first flange 6 in the state where the first and second inner rings 41, 3 are fitted onto the step portion 8.

In the case of this example, the hub 2 can be made of a carbon steel containing carbon less than 0.45 weight %, and, the portion illustrated with the cross hatching in FIG. 14, that is the base end portion of the first flange 6, the base end portion of the step portion 8 including the step face 12, the outer peripheral surface of the step portion 8 except for the portion closer to the axially inner end are subjected to the quench hardening process to increase the hardness in these portions. However, in at least the cylindrical portion of the hub 2, the portion where the crimped portion 19 is formed, is not subjected to quench hardening and is left as it is formed or forged.

Incidentally, the reasons why the quench hardening treatment is carried out on the portions of the hub 2 as mentioned above and the reasons why the axial position of the axially inner end of the quench hardened layer illustrated by cross hatching (Point "X" in FIG. 14) is limited are similar to what is explained in the first example.

In the case of the rolling bearing unit for vehicle wheel support of this example constructed as mentioned above, the hub 2 itself is not formed with the inner ring raceway, and therefore the hub 2 can be made of a carbon steel containing carbon less than 0.45 weight % for easy formation of the crimped portion 19. However, the quench hardened layer is provided in the portion of the hub 2 indicated with cross hatching in FIG. 14. Accordingly, no fretting wear is produced in the portion where the quench hardened layer is provided, and no deformation is caused in the portion where the quench hardened layer is provided, so that the strength and durability of the hub 2 can be secured.

On the other hand, at least the cylindrical portion 20 provided in the hub 2 is not subjected to quench hardening and is left as it is formed or forged, the processing of the crimped portion 19 for connecting the hub 2 to the first and second inner rings 41, 3 is not inconvenient, and no damage occurs in the crimped portion 19.

The second inner ring 3 fitted onto the step portion 8 is made of a high carbon steel such as bearing steel and quench hardened to the core. Therefore, as in the case of the inner ring 3 in the first example as mentioned above, even if a large load is applied to the second inner ring 3 as the crimped portion 19 is formed in the hub 2, the second inner ring 3 is prevented from being deformed, and the internal clearance of the rolling bearing unit is prevented from being displaced from the desired value. In addition, the diameter of the second inner ring raceway 9 formed on the outer peripheral surface of the second inner ring 3 is prevented from being changed, and its precision is prevented from being worsened, so that the reduction of the rolling fatigue life of the second inner ring raceway 9 can be prevented.

Incidentally, in the case of this example, the hub 2 can be made of a carbon steel containing carbon in the range of from 0.45 weight % to 1.10 weight %. In this case, the strength and durability of the hub 2 is further increased. The structure and function of the other portions are substantially the same to those of the first example.

In this example and in the following tenth and eleventh examples, the content of carbon in the carbon steel for the hub 2 is controlled in the range of 0.20 weight % to 1.10 weight %, and the hardness of at least the cylindrical portion 20 is in the range of from Hv 200 to Hv 300 before crimping. The hub 2 is made of the carbon steel meeting the condition as mentioned above through forging. When the content of carbon in the carbon steel for the hub 2 is in the range of from 0.20 weight % to 0.60 weight %, at least the cylindrical portion 20 after forging and before crimping the cylindrical portion 20 is not subjected to annealing. On the other hand, when the content of carbon in the carbon steel for the hub 2 is in the range of from 0.60 weight to 1.10 weight %, at least the cylindrical portion 20 after forging and before crimping the cylindrical portion 20 is subjected to annealing. The hardness of the hub 2 and the annealing after forging are as explained in the first example.

Figure 15:
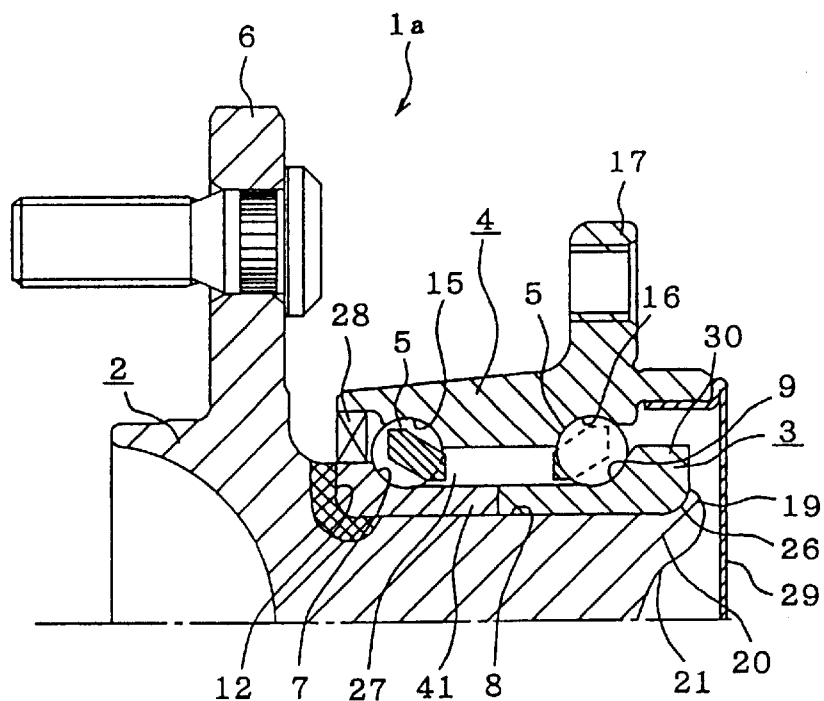
FIG. 15 is a cross sectional view of a half portion of the rolling bearing unit according to a tenth example in the embodiments of the present Invention.
Figure 16:
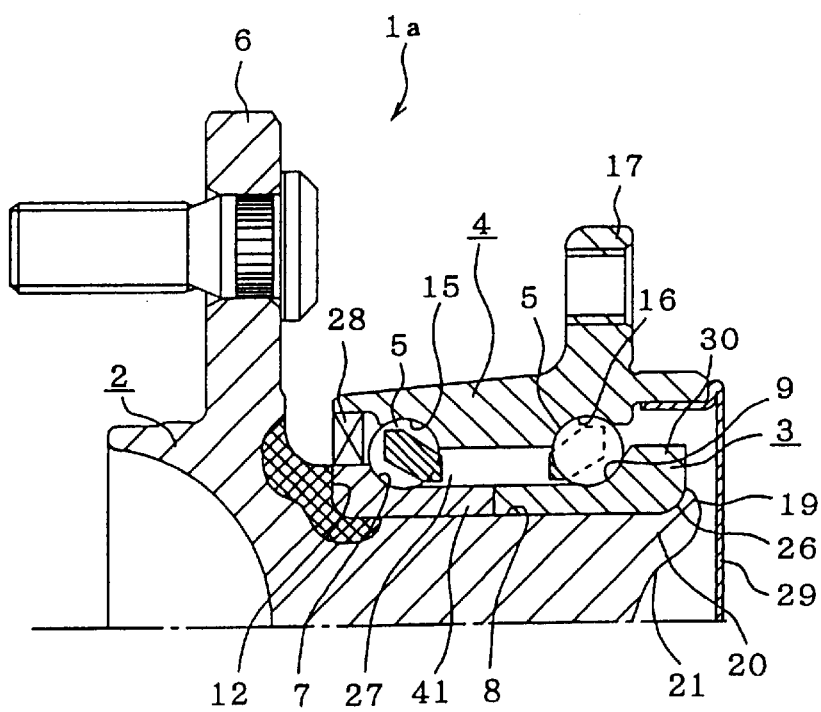
FIG. 16 is a cross sectional view of a half portion of the rolling bearing unit according to an eleventh example in the embodiments of the present invention.
Figure 17:
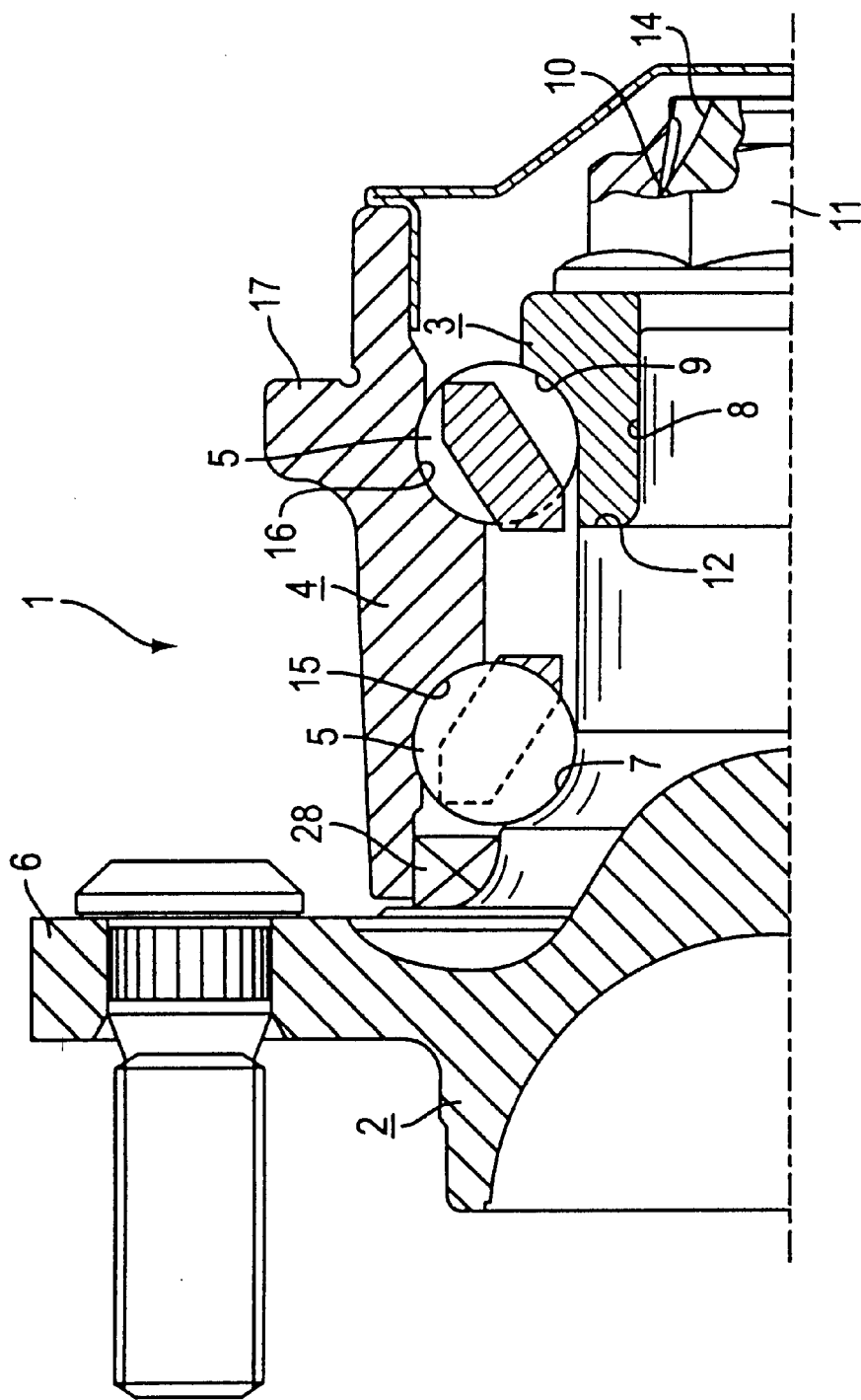
FIG. 17 is a cross sectional view of a half portion of the rolling bearing unit according to a first example of the prior art structure.
Figure 18:
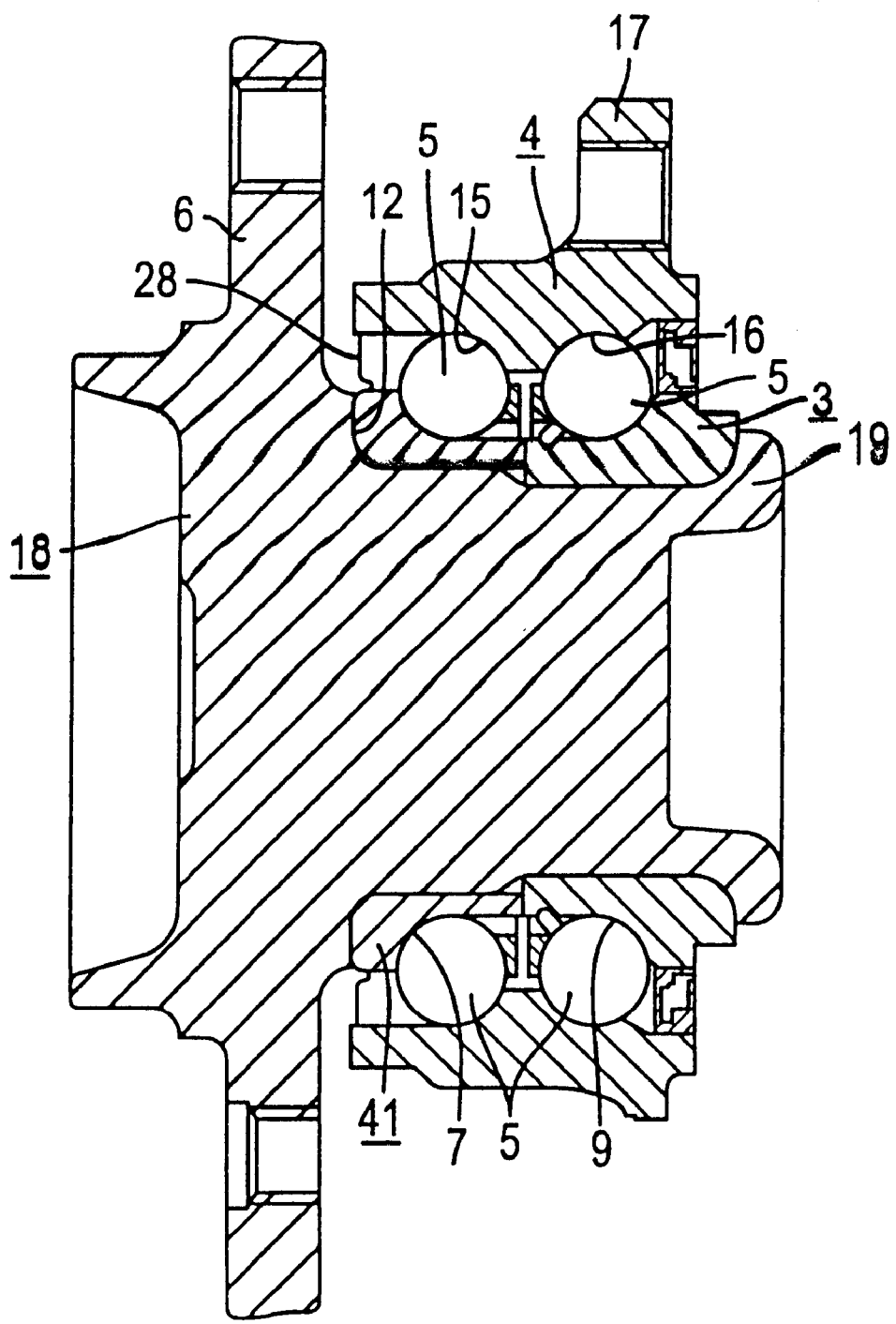
FIG. 18 is a cross sectional view of a second example of the rolling bearing unit according to the prior art structure.

FIGS. 15 to 16 show tenth and eleventh examples, respectively, of the embodiments of the present invention, where the quench hardened layer is applied to only the portion cuff the hub 2 which is subjected to a particularly large load when, the rolling bearing is used. Specifically, in the case of the tenth example as shown in FIG. 15, only the base end portion of the step portion 8 including the step face 12 is provided with the quench hardened layer, and in the case of the eleventh example as shown in FIG. 16, only the base end portion of the step portion 8 including the step face 12 as well as the base end portion of the first flange 6 are provided with the quench hardened layer. The structure and function of the other portions are substantially the same to those of the ninth example.

Although not shown in figures, the crimped portion 19 is not necessarily tightly contacted with the inner ring (second inner ring) 3 on the whole surface of the opposing portions in the examples. Even if there is a clearance in part of the opposing portions, the function and effect of the present invention are similarly obtained.

Incidentally, although the hardness of the cylindrical portion 20 before forming the crimped portion 19 is in the order of from HV 200 to Hv 300, the hardness of the crimped portion 19 is larger than the degree of from Hv 200 to Hv 300 due to work hardening in the state where the crimped portion 19 is formed by crimping the cylindrical portion 20.

Since the rolling bearing unit for vehicle wheel support in the present invention is constructed and operated as mentioned above, the rolling bearing unit for vehicle wheel support with sufficient durability is achieved at a lower cost.

In addition, as illustrated, since the shape of the cylindrical portion where the crimped portion is formed is made to become smaller as it is closer to the tip end edge in the state before crimping out the cylindrical portion radially outward, damages such as crack can be prevented from occurring on the crimped portion, and the diameter of the inner ring fixed to the hub with this crimped portion is prevented from being changed so largely as to cause any practical problem.

Further, the possibility of damage in the inner ring during the fixing process is lowered, and the preload is kept at an optimal value, and the cost can be lowered due to the reduction in the number of parts, processes of the parts and assembling steps.

What is claimed is:

1. A bearing unit for vehicle wheel support comprising:
   a shaft having a mounting flange, a step portion formed on one end portion thereof, and a crimped portion formed on the end side of the step portion, said crimped portion of the shaft having a flat end face with no heat treatment on the outside thereof,
   an inner ring fitted onto the step portion of the shaft and having an inner ring raceway, the inner ring being fixed to the shaft by the crimped portion of the shaft, and
   a constant velocity joint having a main portion and fixed to the shaft with an axial force, the flat end face of the shaft abutted on an axially outer surface of the main portion of the constant velocity joint to support said axial force.

* * * * *

UNITED STATES PATENT AND TRADEMARK OFFICE
Certificate

Patent No. 6,422,758 B1                                                                                              Patented: July 23, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hiroya Miyazaki, Fujisawa, (JP); Yoshihisa Ohnuki, Fuji (JP); Takafumi Kuwano, Fujisawa (JP); Hiroyuki Sawai, Fujisawa, (JP); and Hideo Ouchi, Fujisawa, (JP).

Signed and Sealed this Sixteenth Day of October 2007.

RICHARD W. L. RIDLEY
*Supervisory Patent Examiner*
Art Unit 3682